3,039,872
MATERIAL FOR DIAZOTYPE PROCESSES
Henri Gerard Jean de Boer and Elias Detlev Gerhard Frahm, Delft, Netherlands, assignors to N.V. Lichtdrukpapierfabriek "de Atlas," Delft, Netherlands, a corporation of the Netherlands
No Drawing. Filed July 16, 1959, Ser. No. 827,452
Claims priority, application Netherlands July 16, 1958
41 Claims. (Cl. 96—91)

The invention relates to new material for diazotype processes and more particularly it relates to such material from which prints may be obtained which possess a very good fastness to wet treatments, especially to water.

In British Patent Nos. 774,925, 785,120 and 785,222 there is described the manufacture of azo dyestuffs containing a cyanuric nucleus to which two reactive chlorine atoms are linked. Under special conditions such dyestuffs can react with cellulosic textile materials, yielding colorations which possess a high degree of fastness to wet treatments.

Normally such dyestuffs can be manufactured by reacting cyanuric chloride with monoazo compounds containing a free amino group. From the British Patents Nos. 785,120 and 785,222 and from Belgian Patent No. 561,477 it follows that in certain cases such dyestuffs can also be made by a process which comprises the coupling of a diazo compound with a condensation product obtained by the reaction of cyanuric chloride with a coupling component. However, from the examples given in the three last mentioned patents, it may be seen that for this alternative process of manufacture only diazo compounds are used which couple energetically with coupling components.

When a slowly coupling diazo compound, such as 4-diethylamino-1-benzene diazoniumchloride or the diazo compound derived from p-aminodiphenylamine, is reacted with a condensation product of 1 molecule of cyanuric chloride and one molecule of an aminonaphthol sulphonic acid no or hardly any coupling occurs under the conditions suitable for diazotype processes. Obviously such condensation products are of no value for the manufacture of material suitable for diazotype prints.

We have found that slowly coupling diazo compounds which are sensitive to light and which can be used for diazotype processes, couple very well with certain condensation products containing a triazine ring, to which ring one or two chlorine atoms are attached. The said condensation products contain at least one and at most two residues of an aminophenol or of a polyphenol which residue is attached to the triazine ring. Examples of such residues are those of m-aminophenol, 3-methylamino-1-phenol, 5-amino - 1,3 - dihydroxy benzene and phloroglucinol.

Surprisingly the said condensation products after being condensed with a polymer (such as cellulose, casein, polyvinyl alcohol, wool, silk, polyamides, etc.) still couple very well with diazo compounds which show a low coupling reactivity.

According to our invention we provide new coupling components which are of the formula:

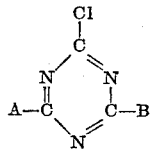

wherein A stands for the residue of an aminophenol or of a polyphenol such as those mentioned above; B stands for a group similar to A or for a halogen atom or for any other group which is not capable of reacting with diazo compounds. As such groups may be mentioned OH, $NH_2$, NH-alkyl, NH-aryl, NH—$C_6H_4$—$SO_3H$, etc.

According to our invention we also provide condensation products of the above stated new coupling components with polymers, such as cellulose (paper), casein, polyvinyl alcohol, polyamides, etc., while we also incorporate said condensation products in material suitable for the production of diazoprints.

The application of the new products of this invention to diazotype material (either on a carrier or as a pretreated layer) stands for a great technical advance. By means of this process when using the normal exposure to light and development with moist air charged with ammonia, it is possible to obtain prints having properties which so far have been unattainable.

These properties are e.g.:
 (1) The print is completely fast to water,
 (2) After development the print can be rinsed with water to remove the decomposition products of the diazo compound, in this way preventing discoloration of the paper,
 (3) Migration of the coupling components and of the dyestuffs produced from these components is impossible,
 (4) The normally used diazo compounds having no sulphonic acid groups may be replaced by sulphonated diazo compounds. The resulting dyestuffs also will be fast to wet treatments on account of the chemical linkage between the coupling component and the material to which it is applied.

Obviously the invention is not limited to the application of one component. Mixtures of the coupling components mentioned above as well as mixtures of diazo compounds may also be used.

The invention is illustrated but not limited by the following examples:

*Example 1*

A solution of 5.3 grams of cyanuric chloride in 27 cc. of acetone is poured and stirred into a mixture of 100 cc. of water and 100 grams of ice. To the suspension of cyanuric chloride thus obtained there are added during 45 minutes a solution of 3.65 grams of 5-amino-1,3-dihydroxy benzene in 250 cc. of water. During this addition the mixture is constantly stirred and cooled with ice. After the addition has been completed the mixture is stirred for another 15 minutes and then slowly neutralized by adding about 15 cc. of 2 N sodium carbonate solution in the course of 15 minutes. Then a solution of 11.5 grams of disodium hydrogen phosphate and 4.8 grams of potassium dihydrogen phosphate in 100 cc. of water and 55 grams of sodium chloride are added. The mixture thus obtained is stirred for two hours, while the temperature still is maintained between 0° and 5° C. Then the precipitate is filtered off, washed with 20% brine and dried in vacuo.

The condensation product of 1 molecule of 5-aminoresorcinol and one molecule of cyanuric chloride thus obtained is condensed with casein as follows:

To a suspension of 4 grams of the said condensation product in 250 cc. of water there are added 5 cc. of formic acid (85%) and a suspension of 4 grams of casein in 250 cc. of water. The mixture is heated at 90° C. for 45 minutes and then boiled for 15 minutes.

The resulting product is applied to paper. Then the paper is treated with a solution containing the usual chemicals, e.g.

5 grams of the double salt of zinc chloride and 4-diethylamino-1-benzene diazonium chloride
3.5 grams of zinc chloride
6 grams of citric acid
3 cc. of ethanol 3.5 cc. of glycerol
2 grams of paradurol
90 cc. of water When the diazotype material thus obtained is exposed to light under a tracing and developed with moist air charged with ammonia, an excellent dark violet print is obtained which is completely fast to water.

Example 2

The condensation product from 1 molecule of m-aminophenol and 1 molecule of cyanuric chloride is prepared in the same way as described in the first example from 5.45 grams of m-aminophenol and 9.0 grams of cyanuric chloride (using about 23 cc. of 2 N sodium carbonate solution to neutralize the reaction mixture).

The condensation of this product with casein is effected by adding a solution of 1 gram of casein in 5 cc. of formic acid to a suspension of 1 gram of the condensation product in 20 cc. of water and 20 cc. of acetone. The mixture thus obtained is heated at 90° C. for one hour and then boiled for 15 minutes.

The mixture is cooled to room temperature whereupon 25 cc. of a solution is added prepared from 9 grams of the double salt of zinc chloride and 4-diethylamino-1-benzene diazonium chloride
15 grams of citric acid
15 grams of zinc chloride
12 cc. of glycerol
15 cc. of isopropyl alcohol
150 cc. of water The resulting mixture is applied to paper. After drying the material, when exposed to light under a tracing and developed with moist air charged with ammonia, yields brown prints which are completely fast to water.

Example 3

A paste is made from 0.5 gram of the condensation product of one molecule of 5-aminoresorcinol and one molecule of cyanuric chloride (prepared in the same way as described in Example No. 1) and a small quantity of water. To this paste are added 100 cc. of a 4% solution of formic acid in water. After some strips of nylon have been submerged in the solution the bath is slowly heated to 95° C. with stirring. The bath in which the above condensation product is condensed with nylon, is kept at this temperature for 30 minutes. Then the nylon strips are taken out of the bath, thoroughly rinsed with water and dried. Finally the material is treated with a solution containing 9 grams of the double salt of 4-diethylamino-1-benzene diazonium chloride and zinc chloride and 15 grams of citric acid in 150 cc. of acetone.

After exposure to light under a tracing and developing with moist air charged with ammonia, the material yields bright violet prints which are completely fast to water.

Example 4

26.3 grams of phloroglucinol are added to a solution of 5.1 parts of sodium methylate in 200 cc. of absolute ethanol. The mixture is boiled for 5 minutes after which it contains sodium phloroglucinate. When cooled, the solution thus obtained is dropwise added in the course of 30 minutes to a stirred mixture of 38.6 grams of cyanuric chloride and 250 cc. of anhydrous benzene while the temperature is maintained between 0° and 5° C. Stirring is continued for two hours. Then the precipitate is sucked off and washed first with benzene, then with anhydrous ethanol.

The condensation product of one molecule of phloroglucinol and one molecule of cyanuric chloride, thus obtained, is condensed with casein as follows:

A solution of 2 grams of casein in 100 cc. of a 4% solution of formic acid is added to a suspension of one gram of the condensation product in a little water. The mixture is heated at 90° C. for 45 minutes and then boiled for 15 minutes. The resultant solution is applied to paper, whereupon the paper is treated with a solution of a diazo compound which contains the usual chemicals (e.g. as described in Example No. 1).

When the diazotype material thus obtained is exposed to light under a tracing and developed with moist air charged with ammonia, the resulting bright blue prints are completely fast to wet treatments.

Example 5

From 0.5 gram of the condensation product of phloroglucinol and cyanuric chloride, prepared as described in Example No. 4, a paste is made with a little water. This paste and a concentrated solution of two grams of sodium bicarbonate are added to a solution of 30 grams of urea, yielding a bath which contains 0.5 gram of the condensation product
2 grams of sodium bicarbonate
30 grams of urea and
100 cc. of water After the addition of some strips of cellophane the condensation is effected at 25° C. during 12–15 hours. Then the cellophane is taken out of the bath, thoroughly rinsed with water and dried.

After treatment with the diazo solution, described in Example No. 3, and drying, the resulting material is exposed to light under a tracing and developed with moist air charged with ammonia. The prints thus obtained show a violet colour and are completely fast to water.

Example 6

A solution of 4.2 grams of 3-methylamino-1-phenol in 50 cc. of absolute ethanol is added in the course of 30 minutes at a temperature between 0° and 2° C. to a stirred solution of 5.7 grams of cyanuric chloride in 80 cc. of benzene. Stirring is continued for another 15 minutes. Then the liquid is neutralized by the addition of a solution of 1.7 grams of potassium hydroxide in 30 cc. of absolute ethanol and the precipitate of potassium chloride is filtered off. The filtrate is concentrated to approximately 20 cc., after which 30 cc. of ethanol are added. The solution thus obtained is used for the condensation with casein which is carried out by adding 5.5 cc. of the ethanol solution to a solution of 2 grams of casein in 100 cc. of a 4% solution of formic acid in water and boiling the mixture for 30 minutes.

When cooled down the solution is applied to paper. Then the paper is treated with the solution of the diazo compound as described in Example No. 1. The material thus obtained yields bright reddish brown prints which are completely fast to water.

Example 7

To 50 cc. of a 4% solution of formic acid in water are added 5 cc. of the alcoholic solution of the condensation product of one molecule of 3-methylamino-1-phenol and one molecule of cyanuric chloride which has been prepared in the way as described in Example No. 6.

In the suspension thus obtained strips of nylon are submerged. Then the stirred liquid is slowly heated at 95° C. and kept at this temperature for 15 minutes. After the nylon has been thoroughly rinsed with water and dried it is treated with the diazo solution in acetone as described in Example No. 3. The resulting material yields excellent reddish brown prints which are completely fast to wet treatments.

Example 8

A paste is made from a little water and 2.6 grams of the condensation product of one molecule of m-aminophenol and one molecule of cyanuric chloride and this paste is added to a solution of 1.3 grams of 5-aminoresorcinol in 50 cc. of water. The mixture is diluted with acetone (approximately 100 cc.) until a clear solution is obtained. Then this solution is heated during some hours at a temperature of about 50° C. When the condensation is completed the liquid is diluted with 150 cc. of water. After the addition of 50 grams of sodium chloride the mixture is stirred for one hour. Then the precipitate is sucked off, washed and dried.

The condensation product of 1 molecule of cyanuric chloride with one molecule of m-aminophenol and one molecule of 5-aminoresorcinol thus obtained is condensed with casein by adding a paste of the condensation product with a little water to a solution of two grams of casein in 100 cc. of 4% formic acid. After the mixture has been boiled for 45 minutes a trace of undissolved material is filtered off and the filtrate is applied to paper. Finally the paper is treated with a solution of the diazo compound (e.g. as described in Example No. 1).

When the material thus obtained is exposed to light under a tracing and developed with moist air charged with ammonia, it yields bright violet prints which are completely fast to water.

We claim:

1. A coupling component for the preparation of diazotype prints and having the formula

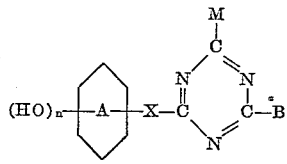

wherein —X— is selected from the group consisting of —NH—, $$-\underset{\text{alkyl}}{\text{N}}-$$

and —O—, the benzene nucleus A contains at least one free hydrogen atom in one of the positions ortho and para to OH, $n$ is at least 1 and at most 2, B is a substituent which is inert to a diazo compound and is selected from the group consisting of —Cl, —OH, —M, and —NHR wherein R is a benzene radical, and M is the radical of a member selected from the group consisting of cellulose, casein, polyvinyl alcohol, polyamides.

2. A coupling component for the preparation of diazotype prints and having the formula

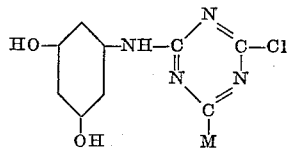

wherein M is the radical of casein.

3. A coupling component for the preparation of diazotype prints and having the formula

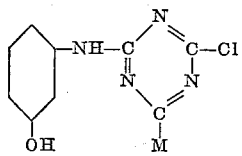

wherein M is the radical of casein.

4. A coupling component for the preparation of diazotype prints and having the formula

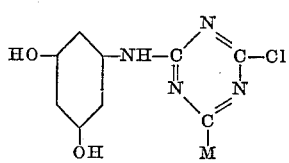

wherein M is the radical of nylon.

5. A coupling component for the preparation of diazotype prints and having the formula

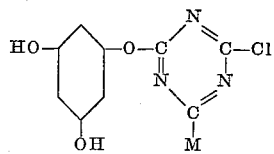

wherein M is the radical of casein.

6. A coupling component for the preparation of diazotype prints and having the formula

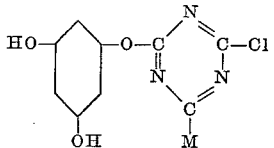

wherein M is the radical of regenerated cellulose.

7. A coupling component for the preparation of diazotype prints and having the formula

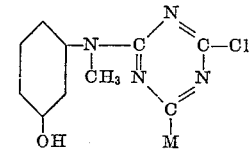

wherein M is the radical of casein.

8. A coupling component for the preparation of diazotype prints and having the formula

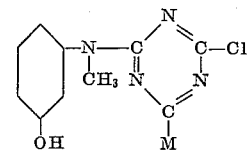

wherein M is the radical of nylon.

9. A coupling component for the preparation of diazotype prints and having the formula

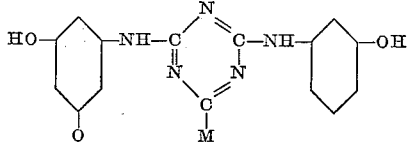

wherein M is the radical of casein.

10. A coupling component for the preparation of diazotype prints and having the formula

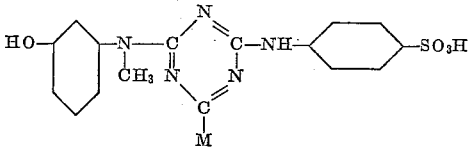

wherein M is the radical of a member selected from the group consisting of cellulose, casein, polyvinyl alcohol, polyamides.

11. Diazotype paper having a surface layer constituted by a coupling component according to claim 1, coupled to a light-sensitive diazo compound.

12. Diazotype paper having a surface layer constituted by a coupling component according to claim 2, coupled to a light-sensitive diazo compound.

13. Diazotype papers having a surface layer constituted by a coupling component according to claim 3, coupled to a light-sensitive diazo compound.

14. Diazotype papers having a surface layer constituted by a coupling component according to claim 4, coupled to a light-sensitive diazo compound.

15. Diazotype papers having a surface layer constituted by a coupling component according to claim 5, coupled to a light-sensitive diazo compound.

16. Diazotype papers having a surface layer constituted by a coupling component according to claim 6, coupled to a light-sensitive diazo compound.

17. Diazotype papers having a surface layer constituted by a coupling component according to claim 7, coupled to a light-sensitive diazo compound.

18. Diazotype papers having a surface layer constituted by a coupling component according to claim 8, coupled to a light-sensitive diazo compound.

19. Diazotype papers having a surface layer constituted by a coupling component according to claim 9, coupled to a light-sensitive diazo compound.

20. Diazotype papers having a surface layer constituted by a coupling component according to claim 10, coupled to a light-sensitive diazo compound.

21. Diazotype print supporting material constituted by a coupling component according to claim 1, coupled to a light-sensitive diazo compound.

22. Diazotype print supporting material constituted by a coupling component according to claim 2, coupled to a light-sensitive diazo compound.

23. Diazotype print supporting material constituted by a coupling component according to claim 3, coupled to a light-sensitive diazo compound.

24. Diazotype print supporting material constituted by a coupling component according to claim 4, coupled to a light-sensitive diazo compound.

25. Diazotype print supporting material constituted by a coupling component according to claim 5, coupled to a light-sensitive diazo compound.

26. Diazotype print supporting material constituted by a coupling component according to claim 6, coupled to a light-sensitive diazo compound.

27. Diazotype print supporting material constituted by a coupling component according to claim 7, coupled to a light-sensitive diazo compound.

28. Diazotype print supporting material constituted by a coupling component according to claim 8, coupled to a light-sensitive diazo compound.

29. Diazotype print supporting material constituted by a coupling component according to claim 9, coupled to a light-sensitive diazo compound.

30. Diazotype print supporting material constituted by a coupling component according to claim 10, coupled to a light-sensitive diazo compound.

31. A process for preparing a coupling component useful in the preparation of diazotype prints which comprises reacting a compound of the formula

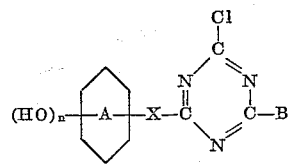

wherein —X— is selected from the group consisting of —NH—,

—N—
|
alkyl and —O—, the benzene nucleus A contains at least one free hydrogen atom in one of the positions ortho and para to OH, $n$ is at least 1 and at most 2, B is a substituent which is inert to a diazo compound and is selected from the group consisting of —Cl, —OH, —M, and —NHR wherein R is a benzene radical, with a member selected from the group consisting of cellulose, casein, polyvinyl alcohol, polyamides, in an aqueous medium at a temperature above room temperature and below about 100° C.

32. A process for preparing a coupling component useful in the preparation of diazotype prints which comprises reacting a compound of the formula

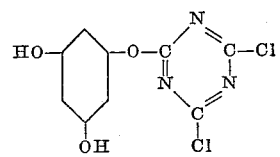

with a member selected from the group consisting of cellulose, casein, polyvinyl alcohol, polyamides, in an aqueous medium at a temperature above room temperature and below about 100° C.

33. A process for preparing a coupling component useful in the preparation of diazotype prints which comprises reacting a compound of the formula

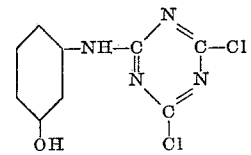

with a member selected from the group consisting of cellulose, casein, polyvinyl alcohol, polyamides, in an aqueous medium at a temperature above room temperature below about 100° C.

34. A process for preparing a coupling component useful in the preparation of diazotype prints which comprises reacting a compound of the formula

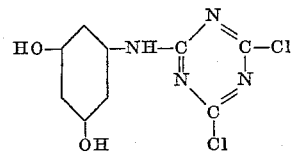

with a member selected from the group consisting of cellulose, casein, polyvinyl alcohol, polyamides, in an aqueous medium at a temperature above room temperature below about 100° C.

35. A process for preparing a coupling component useful in the preparation of diazotype prints which comprises reacting a compound of the formula

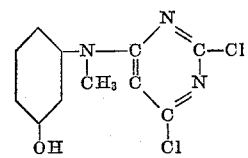

with a member selected from the group consisting of cellulose, casein, polyvinyl alcohol, polyamides, in an aqueous medium at a temperature above room temperature below about 100° C.

36. A process for preparing a coupling component useful in the preparation of diazotype prints which comprises reacting a compound of the formula

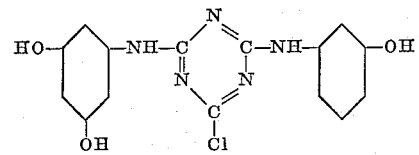

with a member selected from the group consisting of cellulose, casein, polyvinyl alcohol, polyamides, in an aqueous medium at a temperature above room temperature below about 100° C.

37. A process for preparing a coupling component useful in the preparation of diazotype prints which comprises reacting a compound of the formula

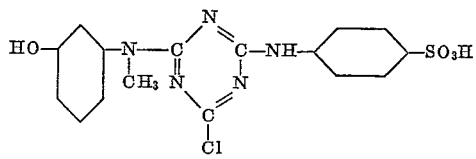

with a member selected from the group consisting of cellulose, casein, polyvinyl alcohol, polyamides, in an aqueous medium at a temperature above room temperature below about 100° C.

38. Coupling components for the preparation of diazotype prints according to claim 1 and having the formula

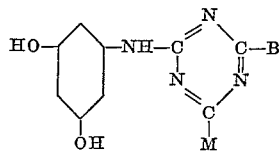

wherein M represents the radical of casein and B is a substituent selected from the group consisting of chlorine, OH and the radical of casein.

39. Diazotype paper having a surface layer constituted by a coupling component according to claim 38, coupled to a light-sensitive diazo compound.

40. Diazotype print supporting material constituted by a coupling component according to claim 38, coupled to a light-sensitive diazo compound.

41. A process for preparing a coupling component useful in the preparation of diazotype prints which comprises reacting a compound of the formula

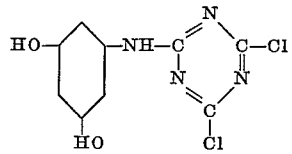

with casein in an aqueous medium at a temperature between room temperature and the boiling point of the solution.

References Cited in the file of this patent

UNITED STATES PATENTS

| | | |
|---|---|---|
| 1,886,480 | Haller et al. | Nov. 8, 1932 |
| 1,896,892 | Haller et al. | Feb. 7, 1933 |
| 2,025,660 | Haller et al. | Dec. 24, 1935 |
| 2,241,321 | Schlack | May 6, 1941 |
| 2,307,399 | Frohlich et al. | Jan. 5, 1943 |

FOREIGN PATENTS

| | | |
|---|---|---|
| 785,120 | Great Britain | Oct. 23, 1957 |
| 785,222 | Great Britain | Oct. 23, 1957 |